United States Patent [19]

Baker et al.

[11] Patent Number: 5,532,534

[45] Date of Patent: Jul. 2, 1996

[54] BRUSHLESS PERMANENT MAGNET CONDENSER MOTOR FOR REFRIGERATION

[75] Inventors: Gerald N. Baker; Alan D. Crapo, both of Florissant, Mo.

[73] Assignee: Emerson Electric Co., St. Louis, Mo.

[21] Appl. No.: 240,633

[22] Filed: May 11, 1994

[51] Int. Cl.$^6$ .......................... H02K 11/00; H02K 5/00; H02K 5/04; H02K 5/22

[52] U.S. Cl. .......................... 310/89; 310/68 R; 310/71; 310/91

[58] Field of Search .................................. 310/68 R, 89, 310/71, 91, DIG. 6; 174/50, 59, 138 F; 220/284, 285, 315, 324

[56] References Cited

U.S. PATENT DOCUMENTS

| | | | |
|---|---|---|---|
| 2,801,354 | 5/1957 | Donahoo | 310/71 |
| 3,644,765 | 2/1972 | Janson | 310/68 R |
| 4,668,898 | 5/1987 | Harms et al. | 310/68 R |
| 4,673,100 | 6/1987 | Reis et al. | 220/324 |
| 4,791,329 | 12/1988 | Ubukata et al. | 310/68 |
| 4,866,317 | 9/1989 | Katayama | 310/89 |
| 4,883,982 | 11/1989 | Forbes et al. | 310/68 R |
| 4,991,730 | 2/1991 | Pehr | 220/284 |
| 5,097,168 | 3/1992 | Takekoshi et al. | 310/68 r |
| 5,243,135 | 9/1993 | Shotey | 220/284 |
| 5,278,468 | 1/1994 | Escaravage et al. | 310/68 R |
| 5,315,195 | 5/1994 | Bradfield et al. | 310/89 |
| 5,334,897 | 8/1994 | Ineson et al. | 310/89 |
| 5,430,931 | 7/1995 | Fisher et al. | 310/89 |
| 5,453,649 | 9/1995 | Blanchet | 310/71 |

FOREIGN PATENT DOCUMENTS 565312  10/1993  European Pat. Off. .

2-303344  12/1990  Japan .................................. 310/63

Primary Examiner—Clayton E. LaBalle
Attorney, Agent, or Firm—Polster, Lieder, Woodruff & Lucchesi

[57] ABSTRACT

A motor, described as a brushless permanent magnet (BPM) motor, has a cup-shaped, open bottomed enclosure having a side wall and a top wall defining a lower interior space. The side wall has a port interrupting a bottom edge. A printed circuit board or other motor electric circuit is positioned above the top wall, below the stator. Electrical conductors electrically connected to the electric motor circuit extend through the top wall and into the interior space. Current supply conductors extend through the side wall port and are electrically connected to the electrical conductors from the circuit. An enclosure cover member has, projecting into the interior space, at least one deflectable prong with an overhanging lip, and a strain relief block positioned adjacent but spaced from the side wall port. The cover has a tool-receiving aperture to permit engagement of a tool with the prong. A ledge, carried by an inner surface of the enclosure, is positioned complementarily to the prong lip to permit the lip to engage a surface of the ledge remote from an inner surface of the cover to hold the cover in position, but to permit the displacement of the prong by a tool inserted through the cover aperture to release the prong and the cover. In the illustrative embodiment, conductor wires from a circuit board mounted above the top wall are mounted in a connector block within the enclosure, and the lip-engaging ledge is part of the connector block. The enclosure and the cover preferably are constructed from electrically insulative material.

12 Claims, 5 Drawing Sheets

BRUSHLESS PERMANENT MAGNET CONDENSER MOTOR FOR REFRIGERATION

RELATED APPLICATIONS

This application is related to U.S. application Ser. No. 08/237,782, filed May 4, 1994, Hoemann et al., High Efficiency Power Supply and Control for Brushless Permanent Magnet Motor; U.S. application Ser. No. 08/237,780, filed May 4, 1994, Baker, Integral Refrigeration Motor Fan Blades; U.S. application Ser. No. 08/240,629, filed May 11, 1994, Baker et al., Electrical Connection of Printed Circuit Board to Line Leads on Brushless Permanent Magnet Refrigeration Motors; and U.S. application Ser. No. 08/240,635, filed May 11, 1994, May, et al., Integral Connector and Motor Housing, assigned to the assignee of the present invention, the disclosures of which are incorporated herein by reference.

BACKGROUND OF THE INVENTION

This invention relates to dynamoelectric machines in the form of electric motors. While the invention is described with particularity with respect to brushless permanent magnet (BPM) motors, those skilled in the art will recognize the wider applicability of the inventive principles disclosed hereinafter.

There has been, and continues to be, a movement toward high operating efficiency devices. That movement includes a move by appliance manufacturers to provide high efficiency consumer appliances for general use. Certain improvements in such appliance efficiency are more obvious than others. For example, the ubiquitous household refrigerator has at least three electric motors associated with it. They include a hermetic compressor motor which drives the compressor for the refrigerant system, an evaporator motor, and, in many refrigerators, a condenser motor. The general operation of the refrigeration system of the conventional refrigerator is well known. The compressor moves the refrigerant from the evaporator into the condenser. It then forces the refrigerant back to the evaporator through an expansion valve. Refrigerant vapor leaves a compressor at high pressure. As it flows into the condenser, the high pressure causes the vapor to condense back to liquid refrigerant. As this happens, the vapor gives out heat, making the condenser warm. The condenser is at the back or bottom of the refrigerator, and heat flows into the air around the refrigerator, often with the aid of the aforementioned condenser fan. The refrigerant leaves the expansion valve at low pressure, causing it to evaporate inside the pipe and get cold. The evaporator is inside the refrigerator and heat flows into the evaporator, making the refrigerator cold. Again, a fan is used to force air over the evaporator and distribute the cool air throughout the refrigerator interior.

Refrigerators operate day and night and because of that operation, their operation cost is relatively substantial, even when attempts are made to increase their efficiency. Recently, there has been an industry-wide effort by refrigerator OEMs (original equipment manufacturers) to raise the level of refrigerator efficiency.

As will be appreciated by those skilled in the art, brushless permanent magnet motors in operational use offer the best efficiency presently known for electric motors in general use, although switched reluctance motors (SRM) and controlled induction motors (CIM) often are configured to achieve substantially equivalent performance. In the size of the motor of this invention, the brushless permanent magnet motor was found to offer the best engineering solution. A brushless permanent magnet motor is similar to other motor types in that it includes a stator assembly having a core of laminations formed from suitable magnetic material. The core has winding receiving slots formed in it. The rotor assembly commonly is the component that distinguishes a permanent magnet motor from other motors. Unlike other conventional motor constructions, a BPM rotor has at least one permanent magnet associated with it. The motor may be either of a conventional design, in which the stator assembly has an axial opening through the core for reception of the rotor assembly, or the motor can be a so-called inside out motor, which has the rotor assembly outboard of the stator.

While brushless permanent magnet motors offer higher efficiencies, they require an electronic circuit for applying electrical energy to the motor windings for proper operation of the motor. The control circuits required for motor operation often make application of the permanent magnet motor economically unjustifiable.

Condenser and evaporator fans in refrigerators conventionally are small and low cost designs. The low cost design of these motors commonly equates with a relatively low efficiency design. I have found that the lower efficiency evaporator or condenser motors can be replaced with more efficient permanent magnet motors when the assembly and construction techniques disclosed hereinafter are employed for and in the motor design, and the motor control functions are accomplished in accordance with the various disclosures incorporated by reference.

One of the objects of this invention is to provide an economically producible permanent magnet condenser fan motor.

Another object of this invention is to provide a motor design which can be incorporated into a variety of applications.

Another object of this invention is to provide a motor base-enclosure which is electrically insulative.

Yet another object of this invention is to provide a motor base-enclosure that permits easy connection to current supply conductors, which are held securely in place;

Yet another object is to provide such a base-enclosure with a cover that is readily mountable and demountable.

Other objects of this invention will be apparent to those skilled in the art in light of the following description and accompanying drawings.

SUMMARY OF THE INVENTION

In accordance with this invention, generally stated, a motor is provided with an open-bottomed cup-shaped base-enclosure. The enclosure has a side wall and a top wall defining an interior space. The side wall has a port interrupting a bottom edge. In the preferred embodiment described, the motor is a brushless permanent magnet (BPM) motor. A printed circuit board is mounted above the top wall, in the preferred embodiment shown, on an outside surface of the top wall. Electrical conductors, electrically connected to a printed circuit on the printed circuit board, extend from the printed circuit board through an opening in the top wall and into the interior space. Current supply conductors extend through the side-wall port and are electrically connected to the electrical conductors from the printed circuit board. The current supply conductors are generally surrounded by insulating sheaths at the portion extending through the side wall port. A cover has an inside surface from which at least one prong projects into the interior space. The prong is deflectable and has an overhanging lip. A ledge is carried by an inner surface of the enclosure and positioned complementarily to the prong lip to permit the lip to engage a surface of the ledge remote from the cover inner surface to hold the cover in position to serve as a closure for the enclosure. An aperture is formed in the cover to permit the insertion of a tool to displace the prong from lip engaging condition to release the prong and the cover. A strain relief block is positioned adjacent but spaced from the port in the side wall, in the embodiment shown, between the prong and the side wall port, to engage the insulating sheaths of the current-supply conductors.

In the preferred embodiment, an electrical conductor-receiving boss is made integral with an inner surface of the top wall. The boss has slits to receive the electrical conductors from the printed circuit board to extend transversely of a long dimension of the boss, and channels extending longitudinally of the boss to receive the current supply conductors to make electrical connection between the electrical conductors from the printed circuit board and the current supply conductors. The boss has formed in it the ledge that is engaged by the prong lip.

Preferably the enclosure and the cover are made of electrically insulative material, and the prong or prongs and strain relief block are of a piece with the cover, and the electrical conductor-receiving boss is of a piece with the enclosure.

Preferably, also, the outer edge of the side wall of the enclosure is generally circular in plan, and is stepped to provide a seat for the cover. The cover, which is generally circular in plan, has an inwardly projecting peripheral rim that is stepped complementarily to the enclosure edge step, providing a foot to extend into the enclosure edge step seat, while the rim extends closely inboard of the enclosure side wall. A crenellated part extends axially inwardly and radially outwardly a short distance from the rim. The part that projects radially outwardly is of a width to fit closely within the ambit of the enclosure port, and serves the double purpose of retaining the current supply conductors and serving as a locating device for orienting the cover with respect to the port.

DESCRIPTION OF THE PREFERRED EMBODIMENT

Figure 1:
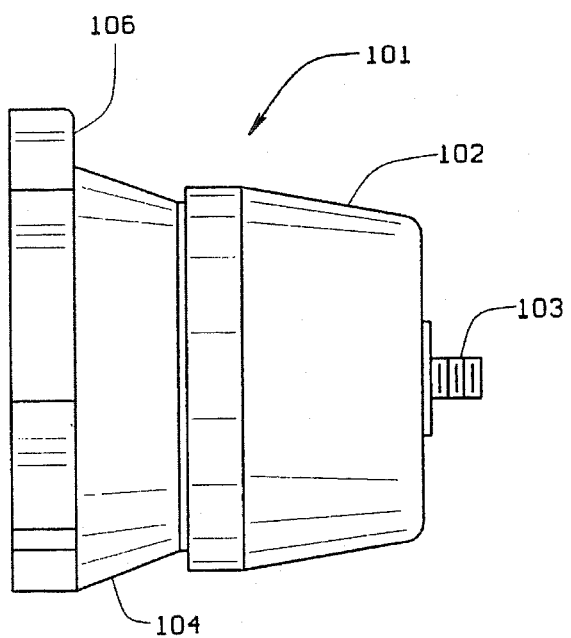
FIG. 1 is a view in side elevation of an illustrative embodiment of motor of the present invention.
Figure 2:
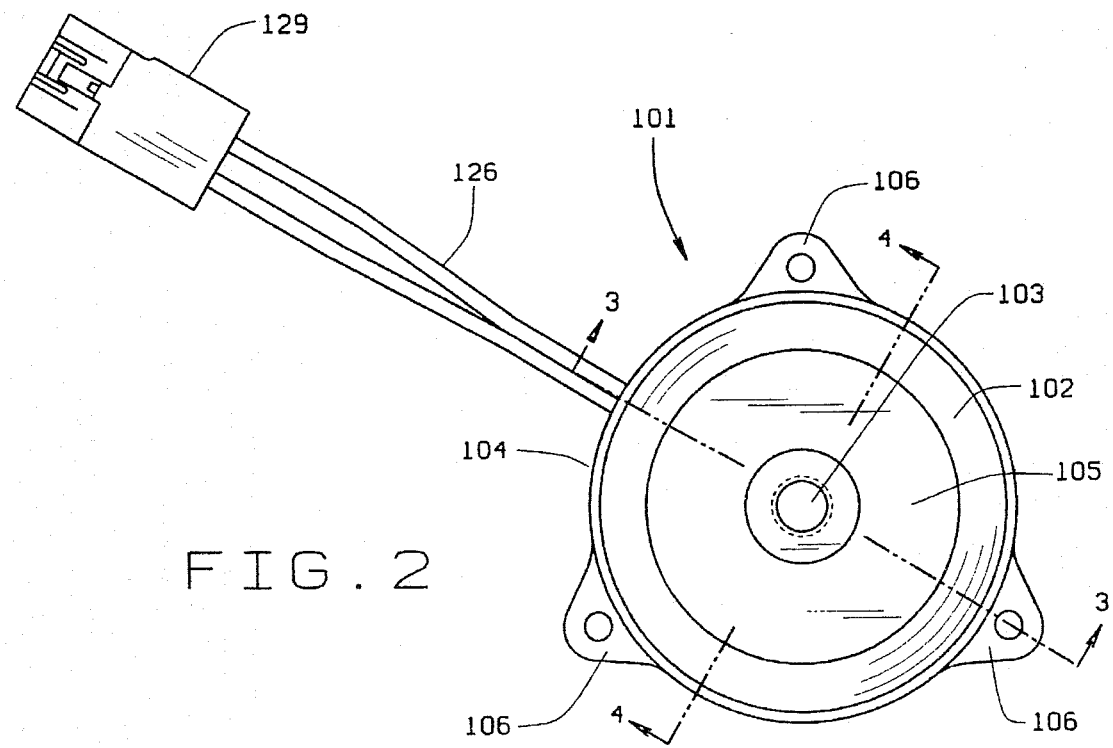
FIG. 2 is a top plan view of the motor shown in FIG. 1.
Figure 3:
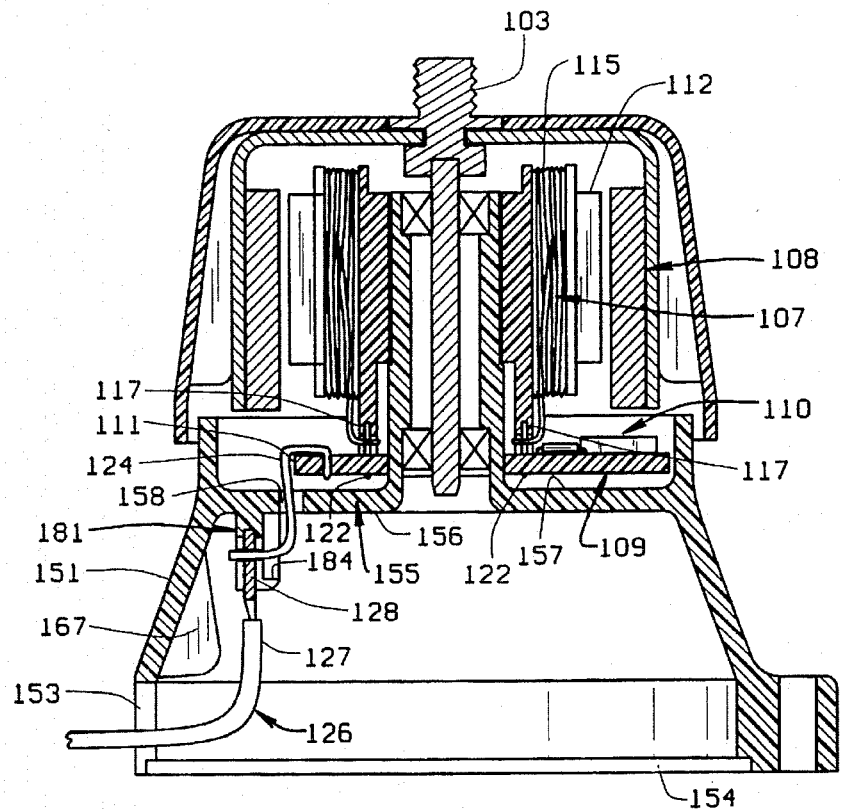
FIG. 3 is a sectional view taken along the line 3—3 of FIG. 2.
Figure 4:
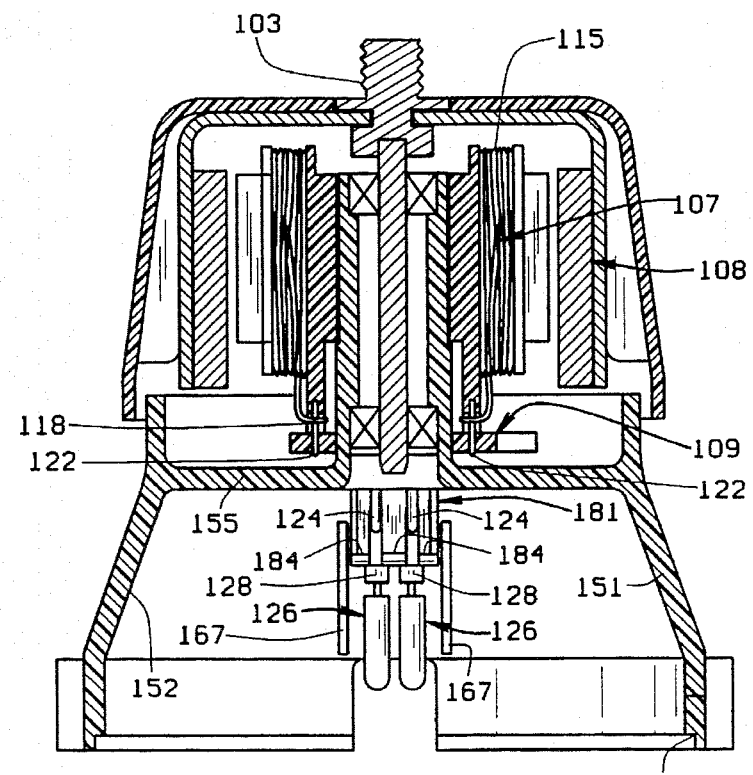
FIG. 4 is a sectional view taken along the line 4—4 of FIG. 3.

Detailed descriptions of the types of motors to which the present invention is applicable, their circuitry and construction are given in the co-pending applications to which reference was made under the heading Related Applications.

Referring now to FIGS. 1–13 for an illustrative example of motor of the present invention, reference numeral 101 indicates the complete motor, in this embodiment, a brushless permanent magnet condenser fan motor. The motor 101 includes a rotor cup 102, which in this embodiment has a threaded shaft 103 or cast thread extending outwardly from it, by which fan blades, not here shown, are mounted. The motor 101 also includes a base-enclosure 104 and a cover 105. Mounting pads or bosses 106, of a piece with the base enclosure 104, are shaped and positioned as required by the configuration of a mounting bracket of a refrigerator.

Within the confines of the rotor cup are a stator assembly 107 and a rotor assembly 108. A motor board 109, in the form of a printed circuit board, is positioned between the stator assembly 107 and an outside surface 157 of a top wall 155 of the base-enclosure 104. Circuit elements indicated generally by the reference numeral 110, are electrically connected, by way of wire leads extending through appropriate holes in the board, to printed connecting circuits on the under side of the board, as is conventional. In this embodiment, the board 109 is not co-extensive with the outside surface 157, but is formed with an off-set 111 over which PC board conductors 124, which are electrically connected to the printed circuit on the under side of the board 109, extend.

The stator assembly includes a stator core 112, and, as shown in detail in FIGS. 10 through 13, an upper molded insulator 113 and a lower molded insulator 114, around a part of which windings 115 extend. The lower molded insulator 114 has, of a piece with it, termination legs 117. Each of the termination legs has lengthwise slits 119 in it, to accept a winding lead end 118, which lies transversely across the leg 117 in the bottom of the slits. The leg 117 also has a longitudinally extending channel 120, in which a spade terminal 122 is seated. The spade terminal 122 makes physical and electrical contact at its outer end with the winding lead end 118, and projects at its tapered outer end from the leg 117, through a hole 123 in the PC board, with the sides of which it makes tight physical engagement, and is electrically connected to the printed conductors on the lower surface of the PC board 109.

The motor board 109 has a hub-receiving aperture, and when the stator assembly is mounted on the motor board, by inserting the spade terminals into the holes in the motor board, and, as is explained in more detail in the co-pending applications, the stator core and motor board are mounted on a hub 159 which is of a piece with the top wall 155 of the base-enclosure 104, the PC board conductors 124 extend through an opening 158 in the top wall 155, into the interior of the cup shaped base-enclosure.

The interior space of the base-enclosure 104 is defined by the top wall 155, and a side wall 151, which has an inside surface 152, and, extending through an outer edge, a port 153. The lower outer edge of the side wall 151 is stepped inwardly to provide a seat 154.

The top wall 155 has an inside surface 156, with which a connector boss 181 is integral. The connector boss 181 has slots 182 to receive ends of the PC board conductors 124, which are bent to extend transversely of the boss 181, and channels 183 sized to admit and engage spade terminals 128, which are in physical and electrical contact with the conductors 124. The terminals 128 are secured in electrical contact with current supply conductors 126. The current supply conductors 126 have insulating sheaths 127, and extend outside the base-enclosure 104 through the port 153 in the side wall 151. At an outer end of the current supply conductors 126, they can be connected electrically to any suitable terminal, such as a male plug, as is desired in the application to which the motor is being put.

Figure 7:
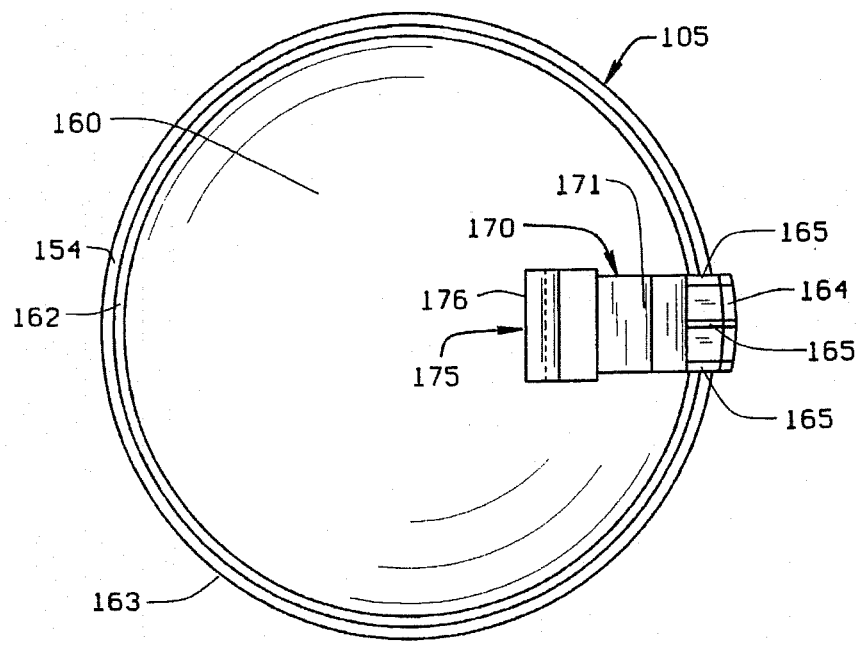
FIG. 7 is a top plan view of the cover shown in FIG. 5.
Figure 8:
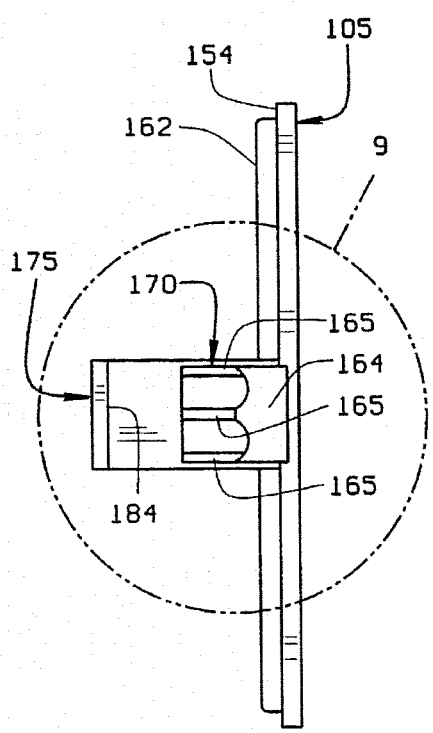
FIG. 8 is a view in front elevation of the cover shown in FIG. 7.
Figure 9:
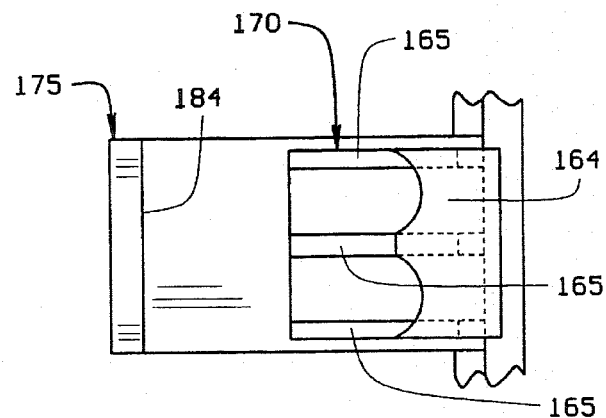
FIG. 9 is an enlarged fragmentary view of the parts enclosed within the circle 9 of FIG. 8.
Figure 14:
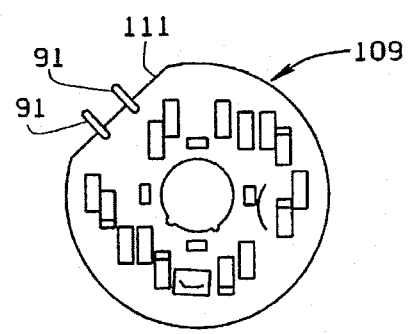
FIG. 14 is a top plan view of a printed circuit motor board used in the illustrative embodiment described.
Figure 10:
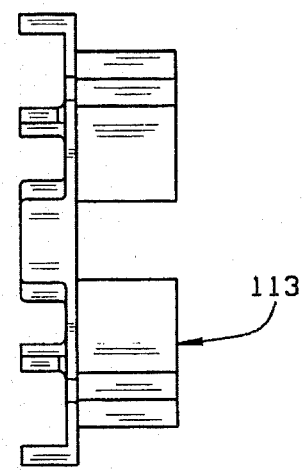
FIG. 10 is a view in side elevation of the upper of two molded insulators inserted into slots in the stator core, and provided with slotted wire-receiving legs.
Figure 11:
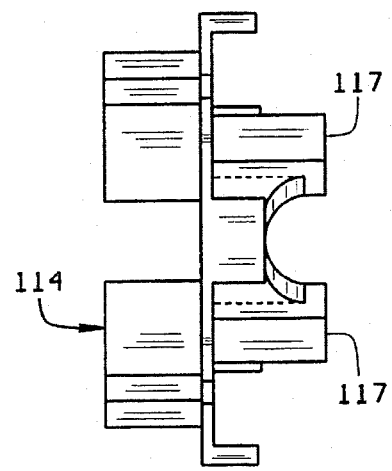
FIG. 11 is a view in side elevation of the lower of two molded insulators.
Figure 12:
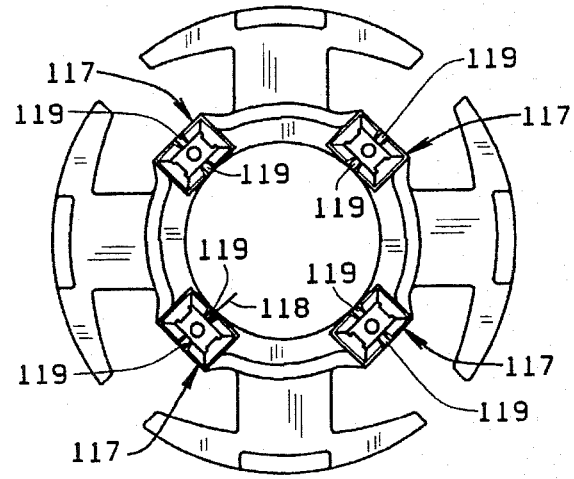
FIG. 12 is a bottom plan view of the lower molded insulator shown in FIG. 11, but showing a stator winding end and spade connector in place.
Figure 13:
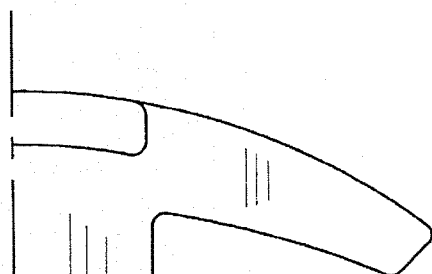
FIG. 13 is a fragmentary enlarged detail view of one segment of FIG. 12.
Figure 13:
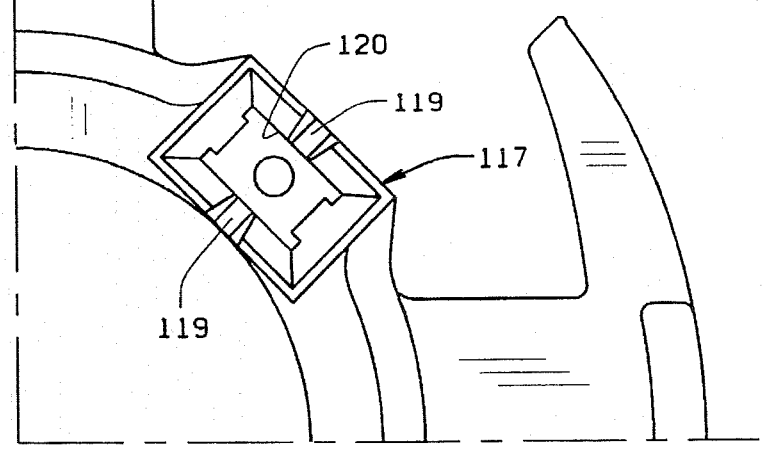

The cover 105 has a planar inner surface 160 and a parallel planar outer surface 161. In this embodiment, the cover is substantially circular in plan, as seen in FIG. 7. The inner surface 160 has a rim 162 adjacent its outer perimeter, but offset complementarily to the stepped seat 154 of the side wall 151, to provide a foot 163 that is seated in the seat 154, while the rim engages the inner surface 152 of the side wall.

Figure 5:
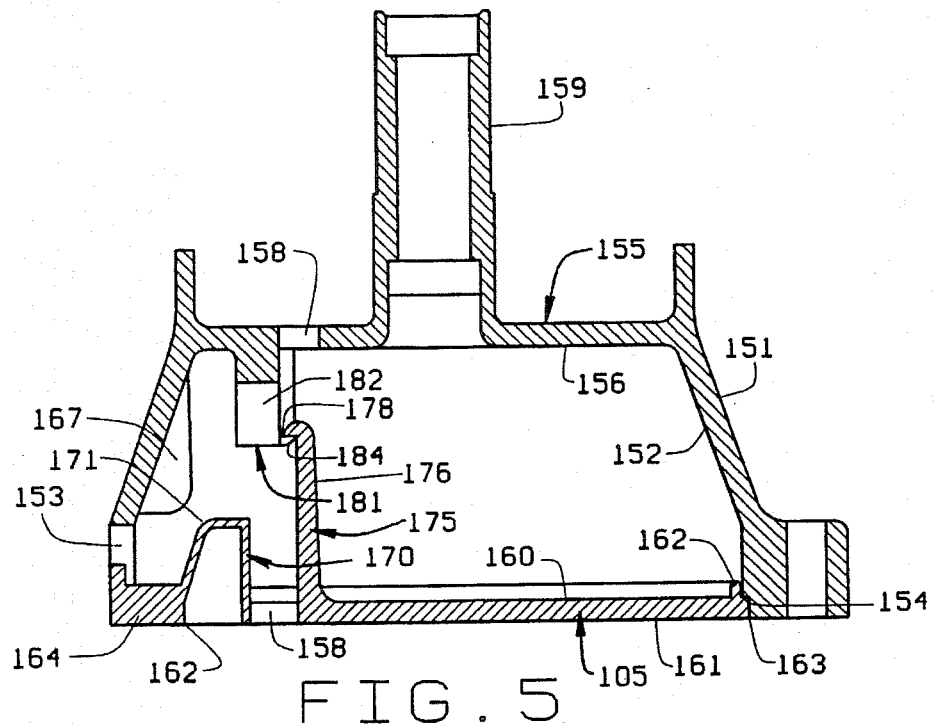
FIG. 5 is a sectional view corresponding to FIG. 3, but without a stator assembly or rotor cap, and with a base cover in place.
Figure 6:
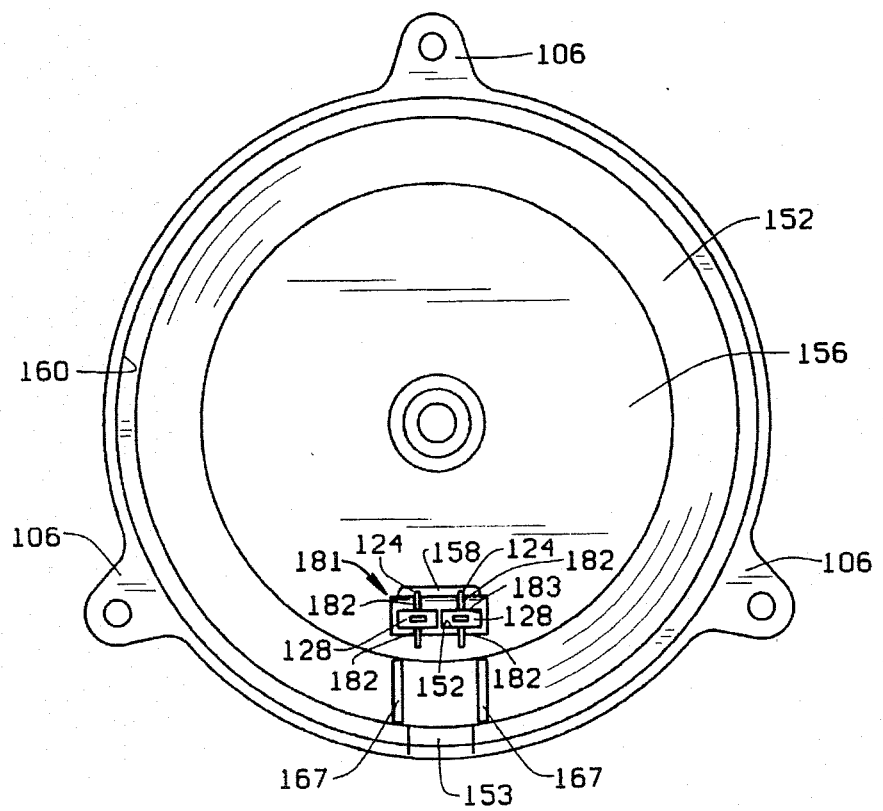
FIG. 6 is a bottom plan view of the motor as shown in FIG. 2.

The inner surface 160 of the cover has a crenellated wall part 164, projecting chordally beyond the rim 162. The crenellated wall part 164 is of a width to fit closely within walls defining a lower end of the port 153, and of a chordal length to remain within the confines of the side wall 151, as shown in FIG. 5. The crenellated wall part 164 has reinforcing ribs 165, extending from an inboard surface of the wall to a lower part of a strain relief block 170. The strain relief block 170 is, in this embodiment, hollow, and is provided at its radially outer side with a downwardly outwardly sloping face and a rounded upper outer edge 171. Spaced radially inwardly from the block 170, a prong 175 is made of a piece with the inner side surface 160 of the cover. The prong 175 has a wide, relatively thin stem 176 that is deflectable, and has at its uppermost end, a lip 178, which, when the cover is in place, engages a complementary surface of a ledge 184 of the connector boss 181. The upper part of the lip 178 and the lower part of the ledge 184 are sloped complementarily. The stem 176 is stiffly deflectable, so that when the cover is installed, it can be cammed away from the under side of the ledge 184 by the engagement of the sloping surfaces of the ledge and lip until the underside of the lip clears the upper surface of the ledge, and then snaps back into place to hold the cover in position. When it is desired to remove the cover, it is only necessary to insert a screwdriver blade or the like through an opening 158 in the cover, between the strain relief block 170 and the stem 176, to deflect the stem enough to cause the lip 178 to clear the ledge 184, and the cover will be released.

The insulating sheaths of the current supply conductors are caged between the upper surface of the crenellated wall and a surface defining the upper edge of the port 153, and between the radially outer wall of the strain relief block 170 and the side wall, between wings 167 that are formed as a part of the inner surface 152 of the side wall 151, parallel with side walls of the strain relief block 170.

As is apparent from the above description and from the description in the co-pending applications, the motor assembly is constructed entirely without the use of threaded fasteners or other similar mechanical types of fasteners. In addition, the construction of the assembly is substantially simplified and may be automated in a number of respects. The stator assembly is plugged into the motor board 109, thereby making the electrical connection between windings 115 of the stator assembly 107 and the board 109 merely by that interconnection. The entire assembly, with the PC board conductors 124 oriented downwardly toward the base-enclosure, is installed on the hub 159, the conductors 124 extending into the interior space of the base-enclosure. The ends of the conductors 124 can then be pulled through the slots 182 and the current supply conductor terminals inserted to complete the electrical connection. The current supply conductors 126 are then led out through the open-bottomed port 153, and the cover 105 snapped into place, and the motor is completed.

Numerous variations, within the scope of the appended claims, will occur to those skilled in the art in light of the foregoing disclosure. Merely by way of example, combinations of various elements of other types of motors and of the present invention as shown in FIGS. 1–13 and described, can be used. The design silhouette of the motor assembly may vary. If, for example, to accommodate a particular application, a square or other non-circular enclosure is required, the cover can be shaped appropriately, or a circular opening can be provide within the outline of the enclosure. Especially in the preferred embodiment described, the cover can be made smaller, but the problems of molding the enclosure become greater. A pair of prongs can be employed, with lips embracing ledges on opposite sides of a suitable boss, or a another, fixed prong can be provided spaced from the prong to be deflected, as, for example, diametrically opposite the deflectable prong, to hook over a lip, so that the cover swings around the fixed prong. These variations are merely illustrative.

What we claim is:

1. A motor with a base-enclosure, said enclosure being cup shaped and open-bottomed, said enclosure having a side wall and a top wall defining an interior space, said side wall having a port interrupting a bottom edge; an electrical circuit associated with said motor; electrical conductors electrically connected to said motor circuit, said electrical conductors extending into said interior space; current supply conductors extending through said side wall port and electrically connected to said electrical conductors, said current supply conductors being surrounded by insulating sheaths at the portion extending through said port, and an enclosure cover member, said cover member having an inside surface having projecting upwardly therefrom deflectable prong means with an overhanging lip, and strain relief means positioned between said prong means and said side wall port, said cover having at least one tool-receiving aperture to permit engagement of a tool with said prong means, and ledge means carried by an inner surface of said enclosure and positioned complementarily to said prong means lip to permit said lip to engage a surface of said ledge means remote from said cover inner surface to hold said cover in enclosure closing position, but to permit the deflection of said prong means by a tool inserted through said cover aperture to move said lip from off said ledge, hence to release said cover.

2. The motor of claim 1 wherein said prong means and strain relief means are of a piece with said cover.

3. The motor of claim 1 wherein said enclosure and cover are made of electrically insulative material.

4. The motor of claim 1 including a crenellated wall part on a margin of said cover, said crenellated wall part being generally parallel with and outboard of said strain relief means and within the compass of said side wall port to accommodate said insulating sheaths and hold them snugly in said port.

5. The motor of claim 1 wherein the enclosure side wall is generally circular in plan and has an inner annular step at its open end to form a seat for said base member cover member.

6. The motor of claim 5 wherein said cover is generally circular in plan, and has a peripheral rim projecting upwardly and stepped complementarily to a base side wall step, and said crenellated wall part projects chordally outwardly of said rim and axially above said rim to serve to locate said part with respect to said side wall port.

7. The motor of claim 5 wherein said cover member has an upstanding perimetric rim complementarily offset radially inwardly to fit within the ambit of said base member side wall, with a foot part in said seat.

8. The motor of claim 2 wherein said strain relief means is in the form of a block with side walls, and wings integral with said enclosure side wall interior surface, oriented axially, project toward and parallel with said side walls.

9. A brushless permanent magnet motor with a stator mounted on a hub projecting from an enclosure, said enclosure comprising an open-bottomed cup-shaped base-enclosure, said base-enclosure having a side wall and a top wall defining an interior space, said side wall having a port interrupting a bottom edge; a printed circuit board mounted above said top wall and below said stator; electrical conductors electrically connected to a printed circuit on said printed circuit board, said electrical conductors extending from said printed circuit board through said top wall and into said interior space; current supply conductors extending through said side wall port and electrically connected to said electrical conductors, said current supply conductors being surrounded by insulating sheaths at the portion extending through said port, and a base cover member, said base cover member having an inside surface having projecting upwardly therefrom deflectable prong means with an overhanging lip, and strain relief means positioned between said prong means and said side wall port, said base cover having at least one tool-receiving aperture to permit engagement of a tool with said prong means, and ledge means carried by an inner surface of said base-enclosure and positioned complementarily to said prong means lip to permit said lip to engage a surface of said ledge remote from said base cover inner surface to hold said base cover in base closing position, but to permit its displacement by a tool inserted through said base cover aperture to release said prong and said base cover.

10. The motor of claim 9 including an electrical conductor-receiving boss having slots to receive said electrical conductors from said printed circuit board circuit and channels to receive said current supply conductors and make electrical connection between said electrical conductors from the printed circuit board circuit and said current supply conductors.

11. The motor of claim 10 wherein said electrical connector receiving boss is of a piece with said top wall and said top wall has an aperture through it adjacent said boss to admit electrical conductors from said printed circuit board circuit to said boss.

12. The device of claim 11 wherein a single prong means is provided and said conductor-receiving boss carries said lip receiving-ledge.

* * * * *